(12) United States Patent
Schwindt

(10) Patent No.: US 7,581,591 B2
(45) Date of Patent: Sep. 1, 2009

(54) PRODUCTION CASING RIPPER

(75) Inventor: Shane Schwindt, Cut Bank, MT (US)

(73) Assignee: Liquid Gold Well Service, Inc., Cut Bank, MT (US)

( * ) Notice: Subject to any disclaimer, the term of this patent is extended or adjusted under 35 U.S.C. 154(b) by 281 days.

(21) Appl. No.: 11/669,087

(22) Filed: Jan. 30, 2007

(65) Prior Publication Data

US 2008/0178721 A1 Jul. 31, 2008

(51) Int. Cl.
*E21B 29/00* (2006.01)
*E21B 43/11* (2006.01)

(52) U.S. Cl. .............. 166/298; 166/55.2; 166/55.3; 175/274; 175/289; 175/291

(58) Field of Classification Search .............. 166/297, 166/298, 55, 55.2, 55.3; 175/263, 274, 289, 175/291; 83/191, 748, 752, 785, 582, 856, 83/590, 623, 639.1
See application file for complete search history.

(56) References Cited

U.S. PATENT DOCUMENTS

| | | | |
|---|---|---|---|
| 1,433,722 A | 10/1922 | Hinderliter | |
| 1,776,025 A | 9/1930 | Hinderliter | |
| 1,777,713 A | 10/1930 | Braden | |
| 1,786,590 A | 12/1930 | Althausen | |
| 1,789,993 A | 1/1931 | Switzer | |
| 2,049,450 A | 8/1936 | Johnson | |
| 2,284,211 A | 5/1942 | Justice | |
| 2,322,695 A | 6/1943 | Kinzbach | |
| 2,328,782 A | 9/1943 | Bynum | |
| 2,525,007 A | 10/1950 | Worden et al. | |
| 2,705,998 A | 4/1955 | Spang | |
| 2,725,936 A | 12/1955 | Hester | |
| 2,743,906 A | 5/1956 | Coyle | |
| 2,753,935 A | 7/1956 | Fredd | |
| 2,859,943 A | 11/1958 | Chadderdon | |
| 3,211,221 A * | 10/1965 | Huitt | 166/298 |
| 3,331,439 A | 7/1967 | Stanford | |
| 3,419,077 A | 12/1968 | Sanford | |
| 3,982,592 A * | 9/1976 | Hamrick et al. | 166/302 |
| 4,068,711 A | 1/1978 | Aulenbacher | |
| 4,106,561 A * | 8/1978 | Jerome et al. | 166/55.2 |
| 4,220,201 A * | 9/1980 | Hauk | 166/55.2 |
| 4,464,826 A | 8/1984 | Bailey et al. | |
| 4,889,197 A | 12/1989 | Boe | |
| 5,076,365 A | 12/1991 | Jenkins | |
| 5,732,770 A | 3/1998 | Beeman | |
| 6,186,234 B1 | 2/2001 | Hailey | |

* cited by examiner

*Primary Examiner*—David J Bagnell
*Assistant Examiner*—Cathleen R Hutchins
(74) *Attorney, Agent, or Firm*—Antoinette M. Tease

(57) ABSTRACT

A production casing ripper comprising a swedge; spring housing; coupling; main housing; end piece; blade; and means for connecting the blade to the plunger; wherein the blade is situated inside of the main housing; wherein a plunger is situated inside of the main housing; wherein a primary spring is situated inside of the spring housing; wherein a primary pull rod is connected to the primary spring at one end and to the plunger at the other end; wherein when hydraulic pressure is introduced through the swedge, the plunger moves downward inside of the main housing and causes the blade to extend through an aperture in the main housing; and wherein when the hydraulic pressure is released, the primary spring causes the plunger to return to its original position, thereby causing the blade to retract.

1 Claim, 13 Drawing Sheets

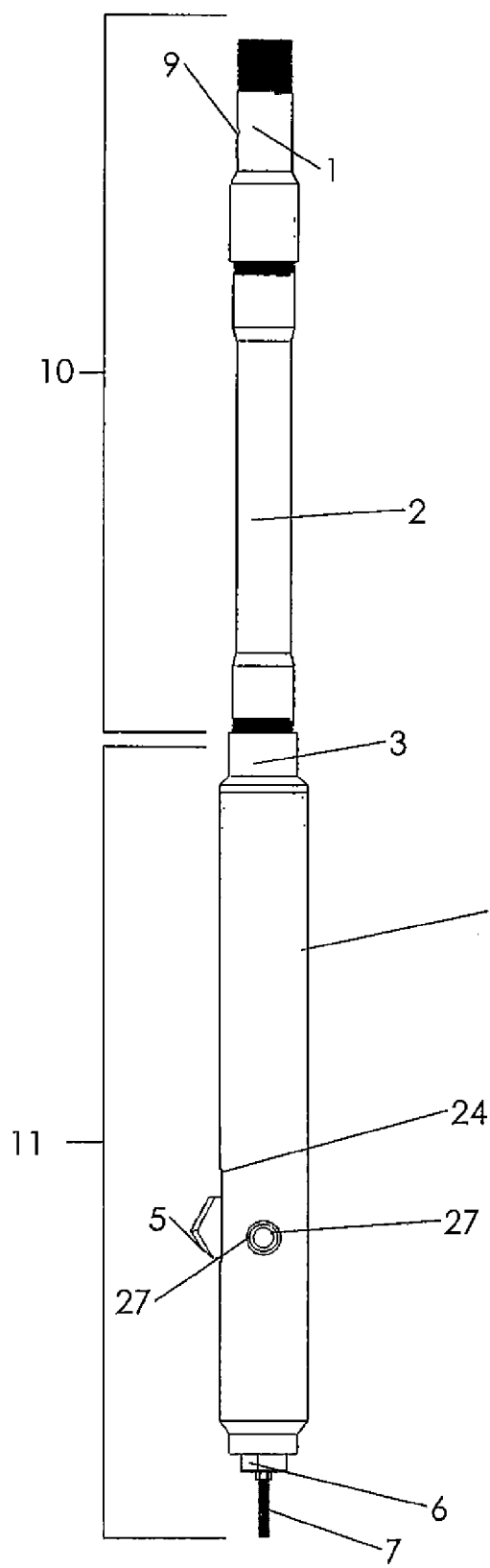
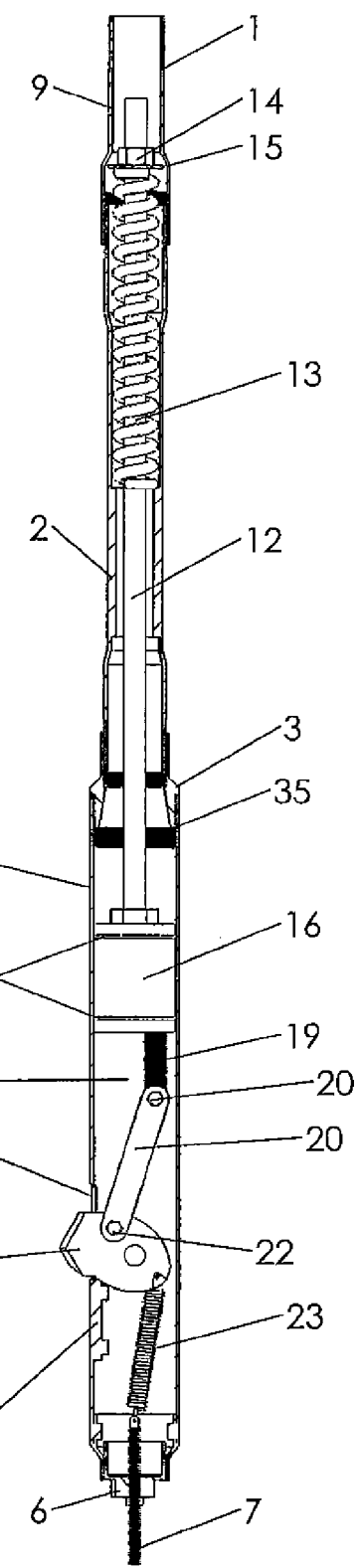
Figure 6
Figure 7

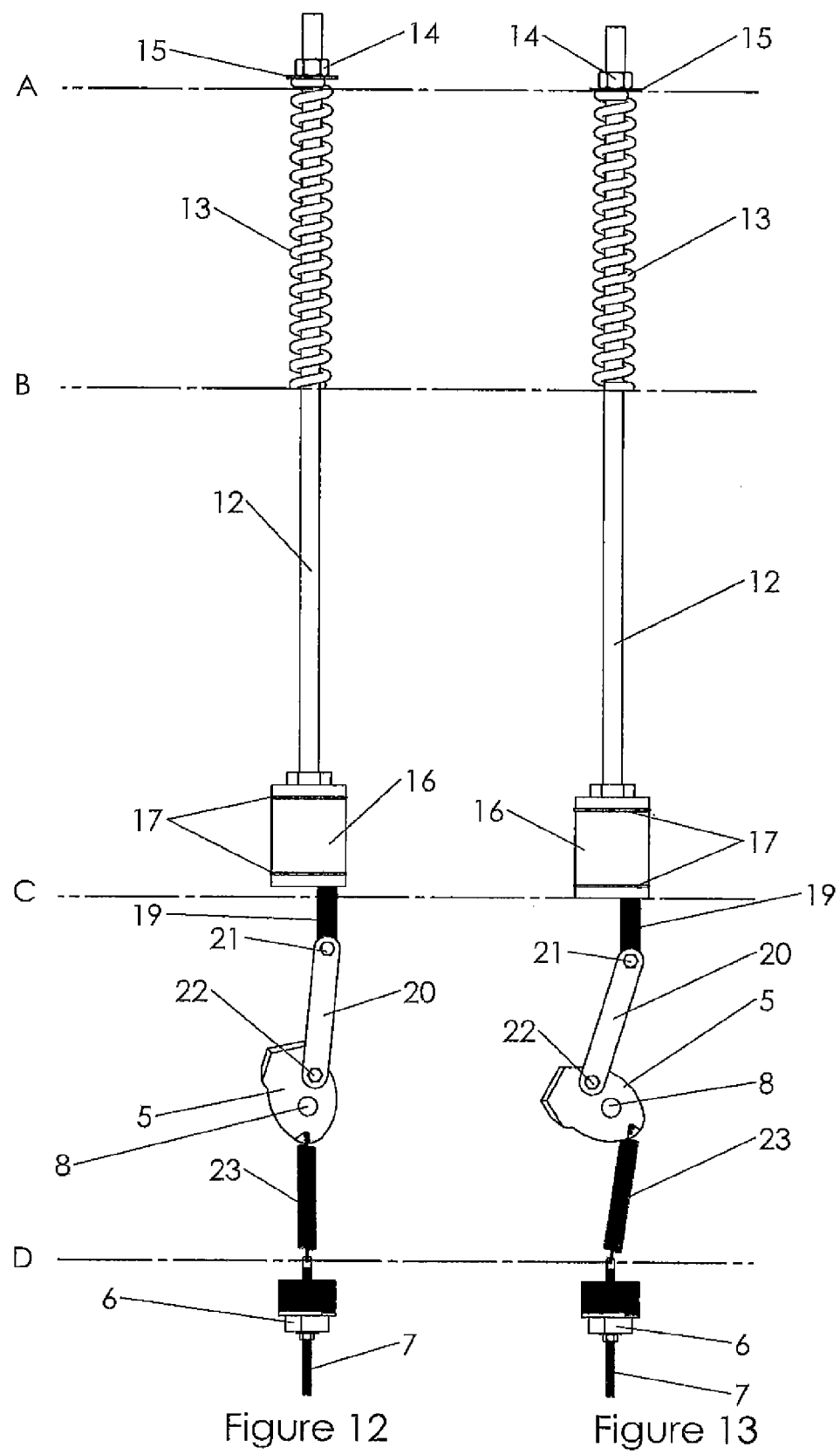

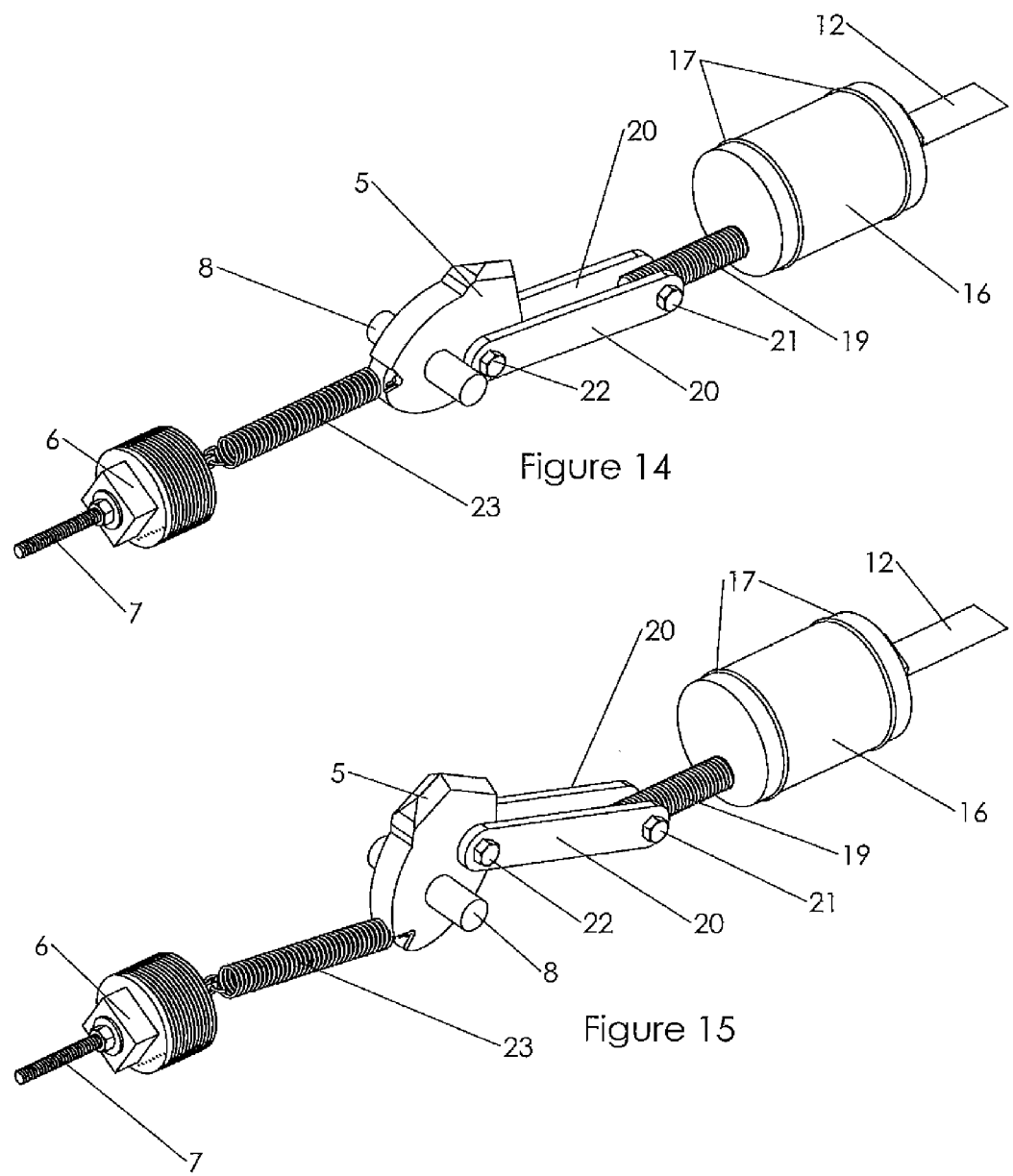

PRODUCTION CASING RIPPER

BACKGROUND OF THE INVENTION

1. Field of the Invention

The present invention relates generally to the field of oil, gas and water wells and, more specifically, to a production casing tipper that cut a continuous vertical slot in well production casing.

2. Description of the Related Art

The prior art includes numerous examples of production casing perforators or cutters, but none of these inventions cuts a continuous vertical slot in the production casing through the use of a single, hydraulically-operated plunger. The prior art generally falls into three categories: casing cutters, single-hole punchers, and under reamers. The first category is represented by U.S. Pat. No. 1,777,713 (Braden, 1928); U.S. Pat. No. 2,049,450 (Johnson, 1936); U.S. Pat. No. 2,284,211 (Justice, 1942); U.S. Pat. No. 2,322,695 (Kinzbach, 1943); U.S. Pat. No. 2,525,007 (Worden et al., 1950); U.S. Pat. No. 2,725,936 (Hester, 1955); U.S. Pat. No. 2,859,943 (Chadderdon, 1958); U.S. Pat. No. 3,331,439 (Sanford, 1967); U.S. Pat. No. 3,419,077 (Sanford, 1968); U.S. Pat. No. 4,068,711 (Aulenbacher, 1978); and U.S. Pat. No. 4,646,826 (Bailey et al., 1987). The invention described in U.S. Pat. No. 5,732,770 (Beeman, 1998) is also a cutter, but it is specifically designed to address the situation where the cutter must pass through a relatively narrow inner diameter tubular prior to positioning in another tubular of wider inner diameter which is to be cut. These inventions are all designed to cut production casing or tubing horizontally rather than vertically.

The second category is exemplified by U.S. Pat. No. 2,328,782 (Bynum, 1943) and U.S. Pat. No. 2,753,935 (Fredd, 1956). The tools described in these patents are designed to punch a single hole in the production casing; they are not designed to cut a continuous vertical slot for any significant distance.

The third category—under reamers—relates to tools that are designed to pass out through the bottom of a pipe and drill a hole that is wider than the pipe through which the under reamer passed. Examples of these types of tools include U.S. Pat. No. 2,743,906 (Coyle, 1953) and U.S. Pat. No. 4,889,197 (Boe, 1989).

Several other inventions do not fall neatly within any of the three above categories. For example, the device described in U.S. Pat. No. 2,705,998 (Spang, 1955) is used to peel threads off couplings; it is not used to perforate a hole in the casing. The device described in U.S. Pat. No. 6,186,234 (Hailey, 2001) is not a production casing ripper or cutter, nor is it an under reamer. Instead, this tool is used to remove lining from the inside of tubing. U.S. Pat. No. 5,076,365 relates to a down hole cleaning system and method for removing debris located in a production zone below a packer in an oil well. These inventions are not similar to the present invention, but they do relate generally to tools that are used down hole.

There are three prior art devices that are somewhat similar to the present invention in that they cut vertical slots in casing, but none of these tools uses a plunger or hydraulics to do so, and all of them have limitations that do not exist in the present invention. These devices are described in U.S. Pat. No. 1,433,722 (Hinderliter, 1922); U.S. Pat. No. 1,776,025 (Hinderliter, 1930); U.S. Pat. No. 1,789,993 (Switzer, 1929); and U.S. Pat. No. 1,786,590 (Althausen, 1930). The Hinderliter inventions are designed to cut or rip the lower end of a casing sleeve out of a coupling or collar connecting the adjacent ends of a pair of casing sleeves. The Switzer tool has a rotating pizza cutter-type blade rather than a single blade, as in the present invention. The Althausen tool has to be lowered to the bottom of the well in order to disengage the blade.

As far as the inventor is aware, the only prior art device that cut vertically and that uses a plunger and hydraulics effectuate the cutting action is the invention described in U.S. Pat. No. 4,220,201 (Haul, 1980). This invention, however, does not create a continuous vertical slot; instead, it perforates the casing at evenly spaced intervals. This is due to the fact that the cutting blade is actually a cutter wheel with evenly spaced teeth extending radially from the center of the wheel. These teeth are what perforate the production casing.

BRIEF SUMMARY OF THE INVENTION

The present invention is a production casing ripper comprising a swedge; a spring housing; a coupling; a main housing; an end piece; a blade; and means for connecting the blade to the plunger; wherein the spring housing is a piece of tubing comprising two ends; wherein one end of the spring housing is attached to the swedge and the other end of the spring housing is attached to the coupling; wherein the main housing is a piece of tubing comprising two ends; wherein one end of the main housing is attached to the coupling and the other end of the main housing is attached to the end piece; wherein the inside diameter of the main housing is greater than the inside diameter of the spring housing; wherein the blade is situated inside of the main housing; wherein a plunger is situated inside of the main housing; wherein a primary spring is situated inside of the spring housing; wherein a primary pull rod comprising two ends is connected to the primary spring at one end and to the plunger at the other end; wherein the main housing comprises an aperture; wherein when hydraulic pressure is introduced through the swedge, the plunger moves downward inside of the main housing and causes the blade to extend through the aperture in the main housing; and wherein when the hydraulic pressure is released, the primary spring causes the plunger to return to its original position, thereby causing the blade to retract. Preferably, the outside diameter of the plunger is greater than the outside diameter of the primary spring.

In a preferred embodiment, the spring housing comprises a top portion, a bottom portion, and an inside wall, wherein the primary spring comprises a top end and a bottom end, wherein the top end of the primary spring is movable, wherein the inside wall of the spring housing is thicker on the bottom portion of the spring housing than on the top portion, wherein the primary spring is situated inside of the top portion of the spring housing, wherein the outside diameter of the primary spring is slightly less than the inside diameter of the top portion of the spring housing, wherein the outside diameter of the primary spring is greater than the inside diameter of the bottom portion of the spring housing, wherein the thicker inside wall on the bottom portion of the spring housing creates a surface against which the bottom end of the primary spring is held stationary.

In a preferred embodiment, the coupling comprises a bottom portion and a top portion, wherein the inside diameter of the top portion of the coupling is less than the inside diameter of the bottom portion of the coupling, and wherein the bottom portion of the coupling comprises a shoulder that limits the upward movement of the plunger inside the main housing.

Preferably, the blade comprises a cutting edge, and the cutting edge is sharp.

In a preferred embodiment, the present invention further comprises a first attachment arm and two second attachment arms, wherein the first attachment arm comprises two ends, wherein the plunger comprises a bottom end and a top end, wherein the primary pull rod is attached to the top end of the plunger, wherein one end of the first attachment arm is attached to the bottom end of the plunger and the other end of the first attachment arm is pivotally attached to the two second attachment arms, wherein each of the second attachment arms comprises two ends, wherein one end of each second attachment arm is pivotally attached to the first attachment arm and the other end of each second attachment arm is pivotally attached to the blade, and wherein when the plunger moves downward inside the main housing, the second attachment arms pivot on the first attachment arm and on the blade, thereby causing the blade to extend outward through the aperture in the main housing.

Preferably, the blade is held in place by a pin that extends from one side of the main housing to the other. In a preferred embodiment, the main housing comprises two bushings that extend inward from the inside of the main housing, wherein the pin passes through the two bushings, and wherein the blade lies between the two bushings.

In a preferred embodiment, the ripper is used to cut production casing inside of an oil, gas or water well, wherein the first attachment arm can be rotated to make the first attachment arm shorter or longer, and wherein said rotation of the first attachment arm alters the angle of the blade and the depth of cut in the production casing.

In yet another preferred embodiment, the present invention further comprises a secondary spring and a secondary pull rod, wherein the secondary spring comprises two ends, wherein one end of the secondary spring is attached to the blade and the other end of the secondary spring is attached to the secondary pull rod, wherein the secondary pull rod is attached to the end piece, wherein the main housing comprises a bottom end, wherein the end piece is attached to the bottom end of the main housing, wherein when the blade is extended through the aperture in the main housing, the secondary spring expands, thereby creating tension in the secondary spring, and wherein when the hydraulic pressures is released, the tension in the secondary spring causes the blade to retract.

In a preferred embodiment, the swedge comprises a weep hole, wherein the plunger comprises one or more O rings, wherein when the weep hole is plugged and hydraulic fluid is introduced through the swedge, the hydraulic fluid is fully contained within the swedge, the spring housing, and the main housing above the plunger, and wherein when the weep hole is not plugged and hydraulic fluid is introduced through the swedge, the weep hole allows fluid pressure inside and outside of the ripper to be equalized.

BRIEF DESCRIPTION OF THE DRAWINGS

FIG. 6 is a side view of the present invention with the blade in an extended position.

FIG. 7 is a side section view of the present invention with the blade in an extended position.

FIG. 12 is a side view of the present invention without the spring housing or the main housing and with the blade in a retracted position.

FIG. 13 is a side view of the present invention without the spring housing or the main housing and with the blade in an extended position.

FIG. 14 is a partial perspective view of the present invention without the main housing and with the blade in a retracted position.

FIG. 15 is a partial perspective view of the present invention without the main housing and with the blade in an extended position.

REFERENCE NUMBERS

Figure 1:
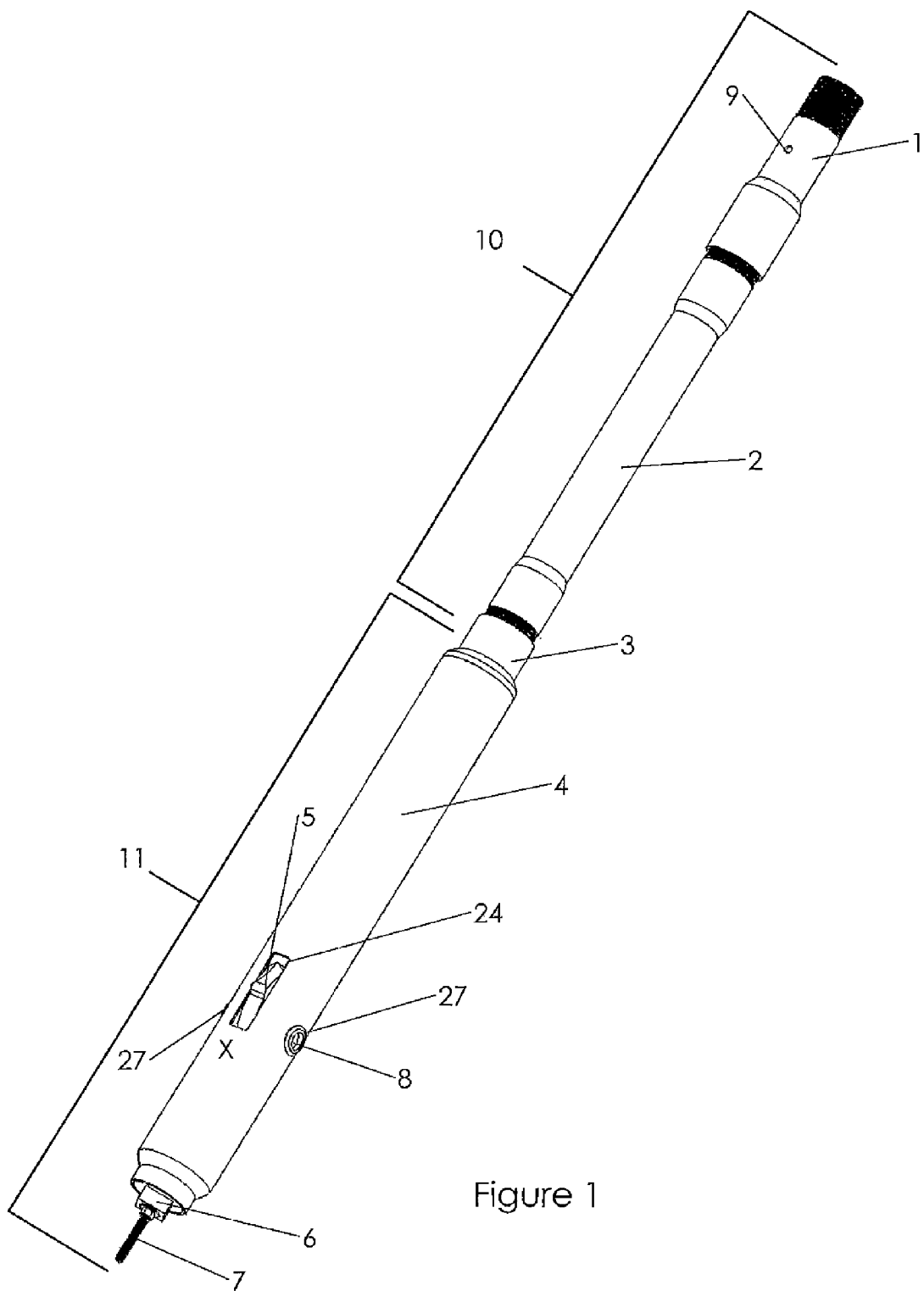
FIG. 1 is a first perspective view of the present invention fully assembled.

1 Swedge
2 Spring housing
3 Coupling
4 Main housing
5 Blade
6 End piece
7 Secondary pull rod
8 Blade pin
9 Weep hole
10 Upper assembly
11 Lower assembly
12 Primary pull rod
13 Primary spring
14 Nut
15 Washer
16 Plunger
17 O-ring
18 Blade chamber
19 First attachment arm
20 Second attachment arm
21 First pivot point
22 Second pivot point
23 Secondary spring
24 Aperture on main housing (for blade)
25 Inside wall of spring housing
26 Lower end of spring housing
27 Aperture on main housing (for blade pin)
28 Bottom end of coupling
29 Top end of coupling
30 Cutting edge (of blade)
31 Peak (of cutting edge)
32 Aperture on blade (for pin)

33 Support member
34 Bushing
35 Shoulder (of coupling)

DETAILED DESCRIPTION OF INVENTION

The present invention is a production casing ripper that is designed to cut a continuous vertical slot in the casing of oil, gas or water wells. As explained further below, the blade on the tool is engaged through the use of hydraulics and a plunger. A safety mechanism on the tool ensures that the blade disengages after the fluid pressure is released.

The present invention is intended to be used for plug and abandonment of older oil and gas wells where it is necessary to replace the concrete behind the production casing. It can also be used during production to evaluate the fluid in a zone behind the production casing (where the casing has not already been perforated) by ripping a slot in the casing at the zone to be evaluated. In water wells, the present invention can be used to perforate holes in the production tubing where the original holes have become plugged due to calcium deposits. These are but a few of the numerous possible applications of the present invention, which is described more fully below in reference to the figures.

Figure 5:
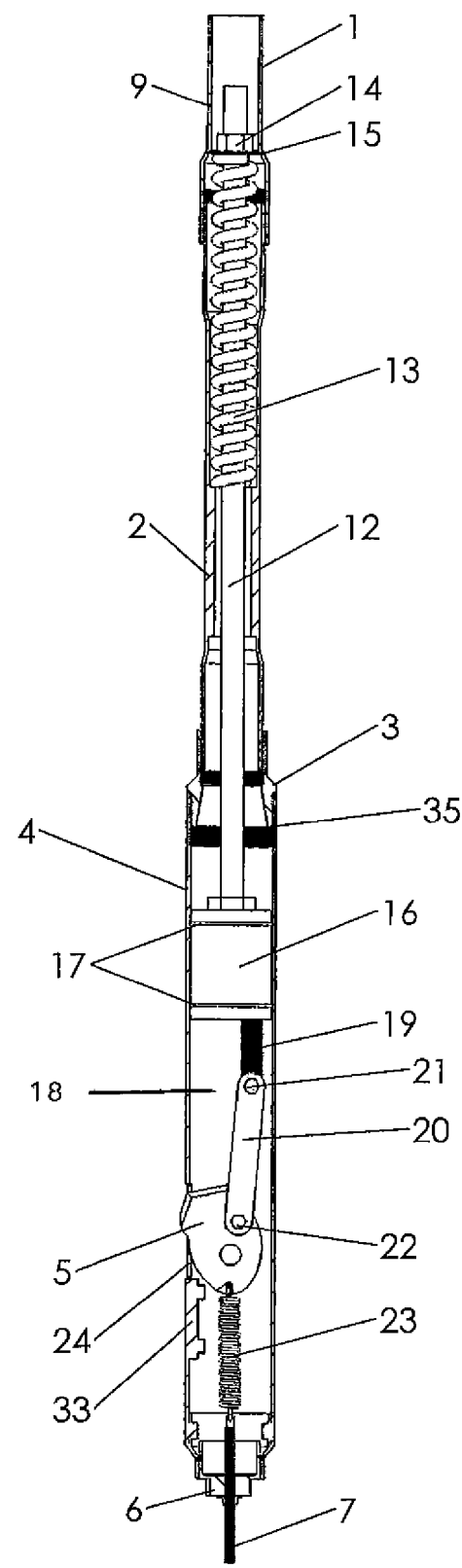
FIG. 5 is a side section view of the present invention with the blade fully retracted.

FIG. 1 is a first perspective view of the present invention fully assembled. As shown in this figure, the invention comprises a swedge 1, a spring housing 2, a coupling 3, a main housing 4, a blade 5, an end piece 6, and a secondary pull rod 7. (The primary pull rod, shown in FIG. 5, is inside the spring housing 2 and main housing 4.) The top end of the tool from the tip of the swedge 1 to the bottom of the spring housing 2 will be referred to herein as the upper assembly 10. The bottom end of the tool from the top end of the main housing 4 to the bottom tip of the secondary pull rod 7 will be referred to herein as the lower assembly 11. When the tool is lowered into the well bore, the lower assembly would enter the well bore first.

The swedge 1 is used to connect the tool to tubing (not shown) that extends from the tool to the surface of the well bore. The tubing serves two purposes—first, it is used to deliver water from the surface to the tool, preferably at pressures exceeding 1000 pounds per square inch (psi). As explained more fully below, this hydraulic pressure is what activates the plunger (see reference number 16 in FIG. 5) and engages the blade 5. Second, the tubing is also used to position the tool (i.e., move it up and down) inside the well bore.

The swedge preferably comprises a weep hole 9 that can either be plugged or left open, depending upon the type of well in which the tool is used. In a dry well (such as, for example, a natural gas well), the weep hole 9 would preferably be plugged to prevent water from escaping from the tool and entering the well bore. In a wet well (such as an oil well), the weep hole 9 is preferably left open to allow equalization of the fluid pressure inside and outside of the tool. Because the weep hole 9 is relatively small, opening of the weep hole 9 does not prevent the water pressure from achieving a level that will activate the plunger and engage the blade.

As shown in FIG. 1, the tool comprises a single blade 5. The blade 5 is situated inside of the main housing 4 and is held in place by a pin 8 that extends from one side of the main housing 4 to the other. (As shown in connection with FIGS. 5 and 18, there are other structural parts that also serve to hold the blade in place.) The pin 8 serves as the axis around which the blade 5 rotates when moving from an engaged to a retracted position. The blade shown in FIG. 1 is in a retracted position; in this position, the blade would not be able to cut the production casing. The blade will only cut the production casing when it is in an extended position.

Figure 2:
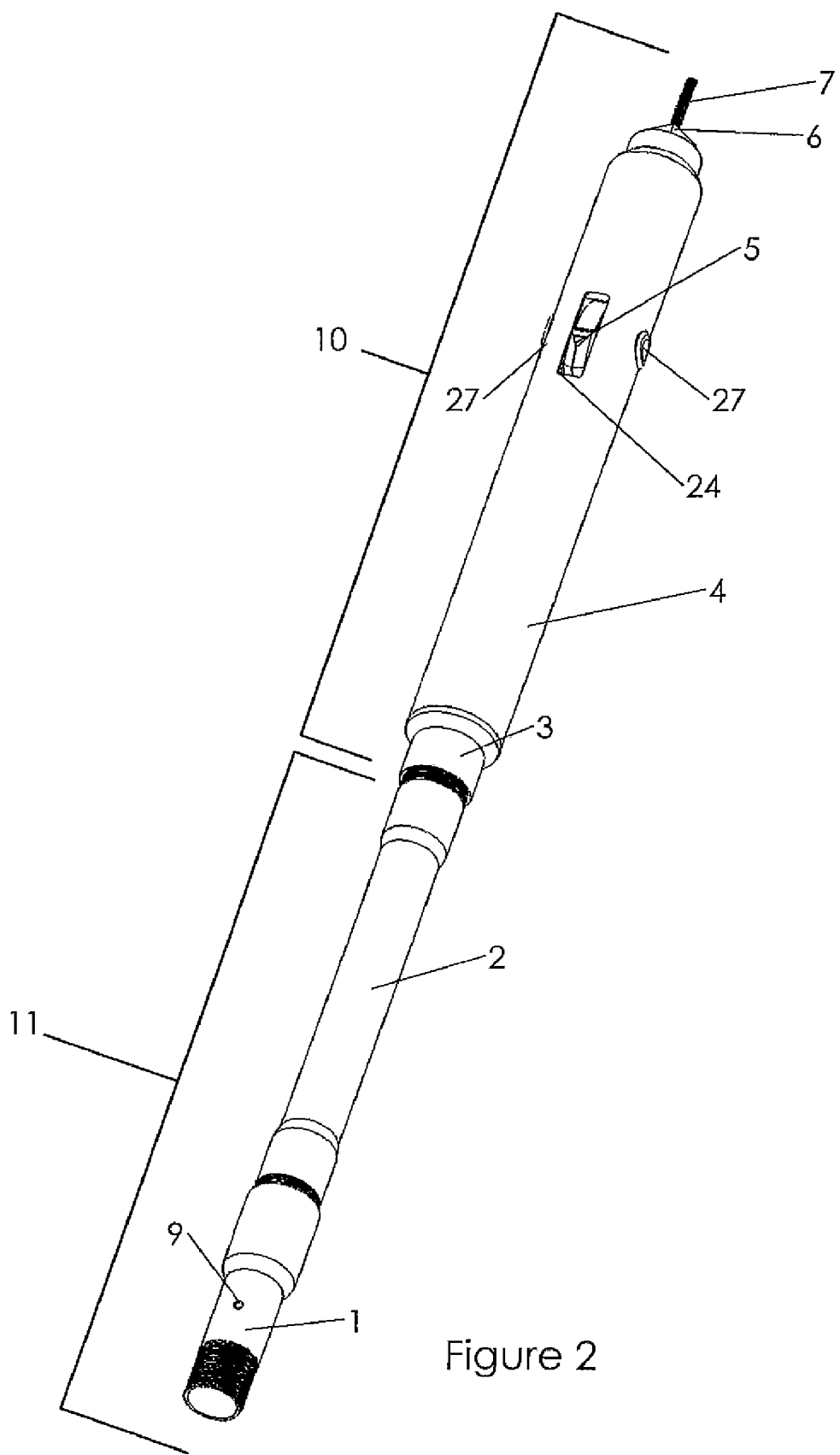
FIG. 2 is a second perspective view of the present invention fully assembled.

FIG. 2 is a second perspective view of the present invention fully assembled. This figure shows the same parts as in FIG. 1, but from a different perspective.

Figure 3:
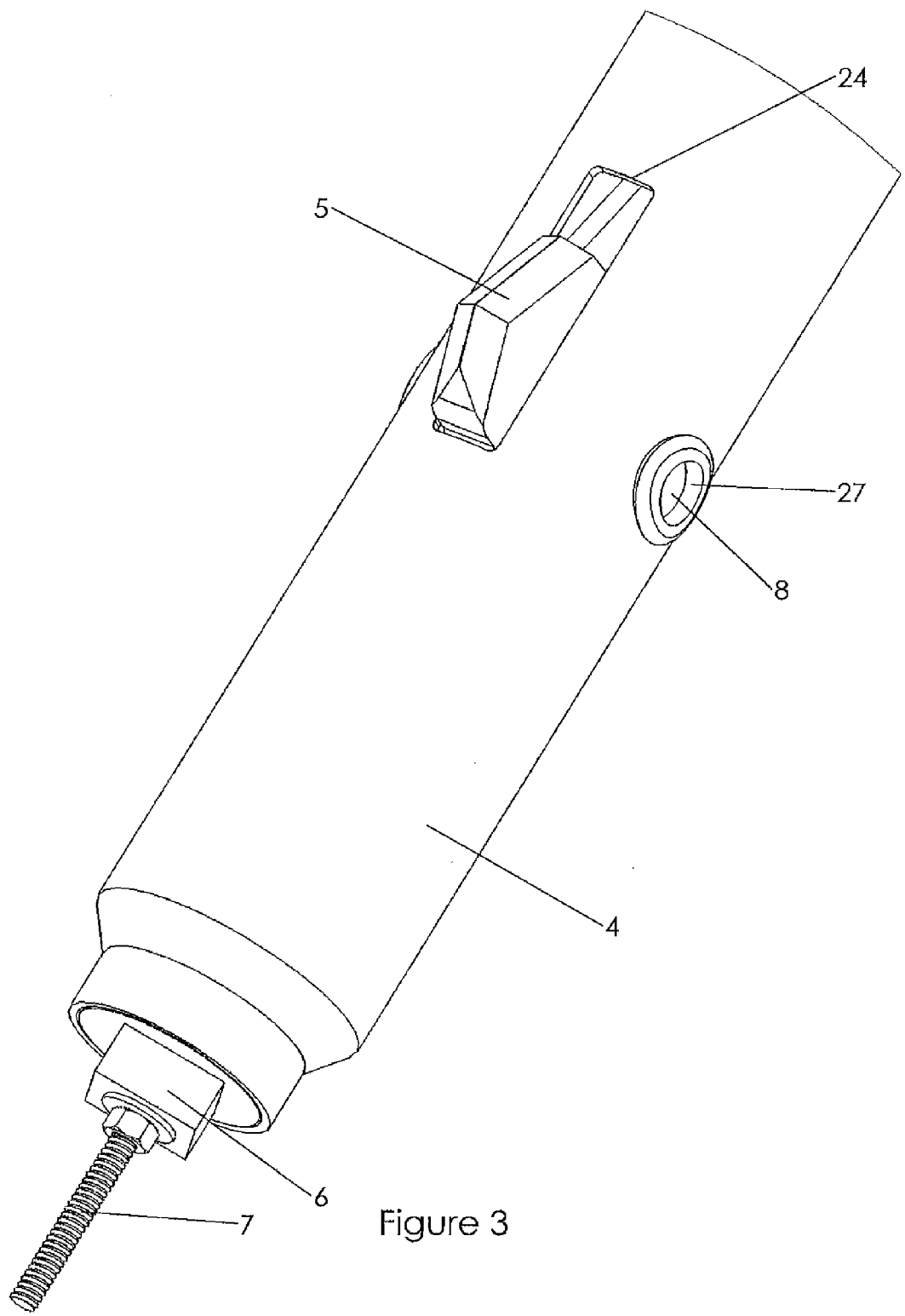
FIG. 3 is a partial perspective view of the lower end of the present invention with the blade in an extended position.

FIG. 3 is a partial perspective view of the lower end of the present invention with the blade in an extended position. In this figure, the blade 5 is shown in an extended position. The mechanism that causes the blade to extend is discussed in connection with FIGS. 5 and 7.

Figure 4:
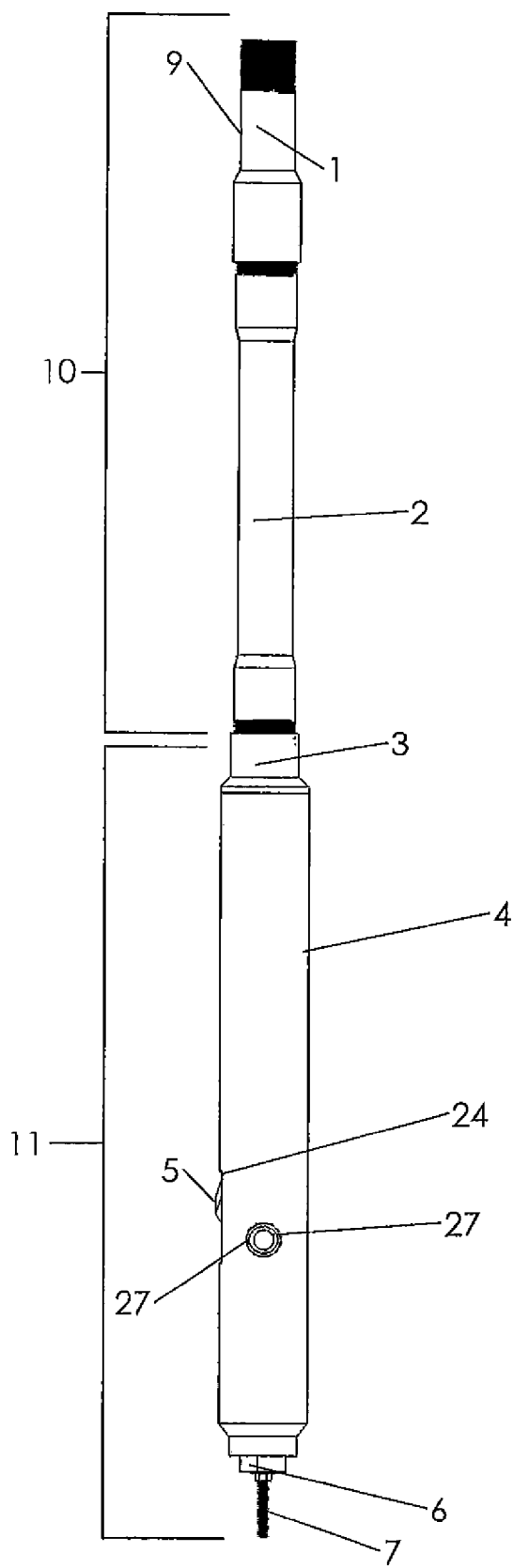
FIG. 4 is a side view of the present invention with the blade fully retracted.

FIG. 4 is a side view of the present invention with the blade fully retracted. FIG. 5 is a side section view of the tool in the same position as that shown in FIG. 4. As shown in FIG. 5, inside the spring housing 2 are a primary pull rod 12 and a primary spring 13. The primary spring 13 is fixedly attached to the primary pull rod 12 at the upper end of the primary pull rod 12, preferably with a nut 14 and washer 15. The inside of the spring housing 2 is constructed such that the walls of the housing 2 are thicker on the bottom portion of the spring housing than they are on the top portion of the spring housing (this is shown more clearly in FIG. 9), which maintains the bottom end of the spring in a stationary position. Thus, as pressure is applied to the top end of the spring 13, the spring compresses downward against the top surface of the thickened walls of the spring housing 2 (see point A in FIG. 9). Because the spring 13 is fixedly attached to the primary pull rod 12, when pressure is applied to the top end of the spring 13, the primary pull rod 12 moves downward. When the pressure on the top end of the spring 13 is released, the tension in the spring 13 causes the pull rod 12 to move back up again to its original position. As shown in FIG. 5, the spring 13 is in an uncompressed position, and the primary pull rod 12 is in its original position.

The primary pull rod 12 is in turn fixedly attached to a plunger 16. The plunger 16 preferably comprises one or more O-rings 17, which prevent water from moving past the plunger 16 and entering the blade chamber 18. Thus, the plunger 16 preferably sits tightly within the main housing 4. When water pressure is applied to the top of the primary spring 13 and the primary pull rod 12 moves downward, the plunger 16 in turn moves downward as well. A first attachment arm 19 connects the bottom end of the plunger 16 to a second attachment arm 20. The second attachment arm 20 connects the first attachment arm 19 to the blade 5. The point at which the first attachment arm 19 connects to the second attachment arm 20 is a first pivot point 21, and the point at which the second attachment arm 20 connects to the blade 5 is a second pivot point 22.

The lower end of the blade 5 is attached to a secondary spring 23, which in turn is attached to the secondary pull rod 7. The secondary pull rod 7 is fixedly attached to the end piece 6.

FIG. 6 is a side view of the present invention with the blade in an extended position. FIG. 7 is a side section view of the tool in the same position as that shown in FIG. 6. In this figure, the blade 5 is in an extended position. When pressure is applied to the top of the primary spring 13 and/or to the top of the plunger 16, the plunger 16 moves downward, causing the second attachment arm 20 to pivot at both pivot points 21, 22. Because the blade is held in position by the pin 8, this pivoting action causes the blade 5 to extend outward. When the blade 5 is extended outward, the secondary spring 23 is extended beyond its resting state, thereby causing tension in the spring 23.

To activate the plunger and engage the blade, fluid (preferably water) is pumped down through the tubing (not shown) into the swedge 1. This fluid creates hydraulic pressure on the top of the primary spring 13 and also on the top of the plunger 16, thereby causing the plunger 16 to move downward. When the fluid pressure is released, the tension in the primary spring 13 causes the spring 13 to decompress, thereby pulling the primary pull rod 12 and plunger 16 back up into their original positions, which in turn causes the blade 5 to retract. The secondary spring 23 acts as a safety mechanism in that if the blade were to fail to retract upon release of the hydraulic pressure, the tension on the secondary spring 23 that was created when the blade 5 extended would pull the blade 5 back into a retracted position.

As shown in FIG. 7, the first attachment arm 19 is not centered on the plunger 16 but instead is situated closer to the inside wall of the main housing 4 opposite the aperture 24 where the blade exits the main housing 4. If the first attachment arm 19 were situated in the center of the plunger 16, it would not allow enough room for the blade to fully retract. The first attachment arm 19 is preferably threaded so that it can be rotated on the plunger 16. By rotating the first attachment arm 19 in one direction or the other, and thereby making it longer or shorter, the angle of the blade 5 can be adjusted to provide a shallower or a deeper cut.

Figure 8:
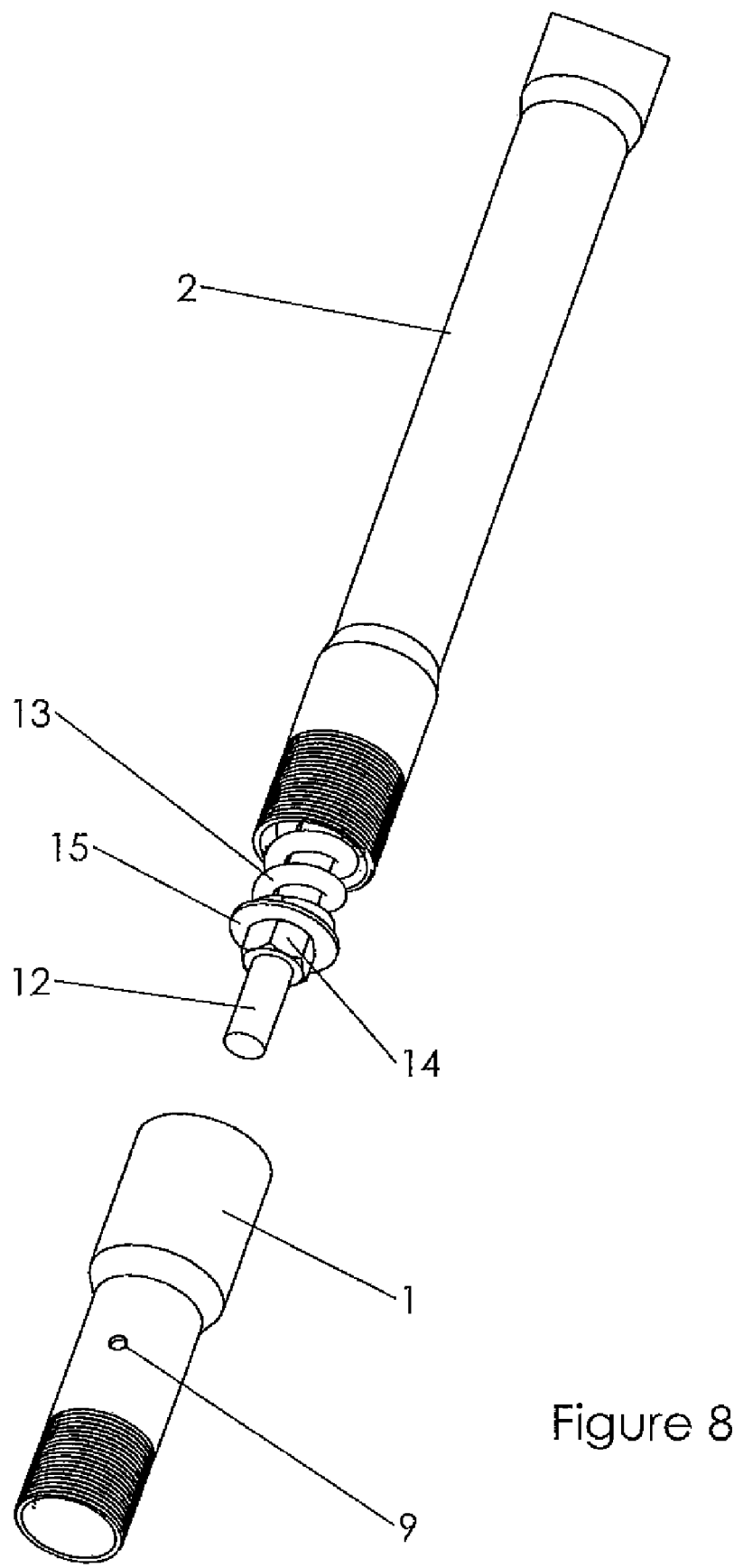
FIG. 8 is an exploded view of the upper assembly of the present invention.

FIG. 8 is an exploded view of the upper assembly of the present invention.

Figure 9:
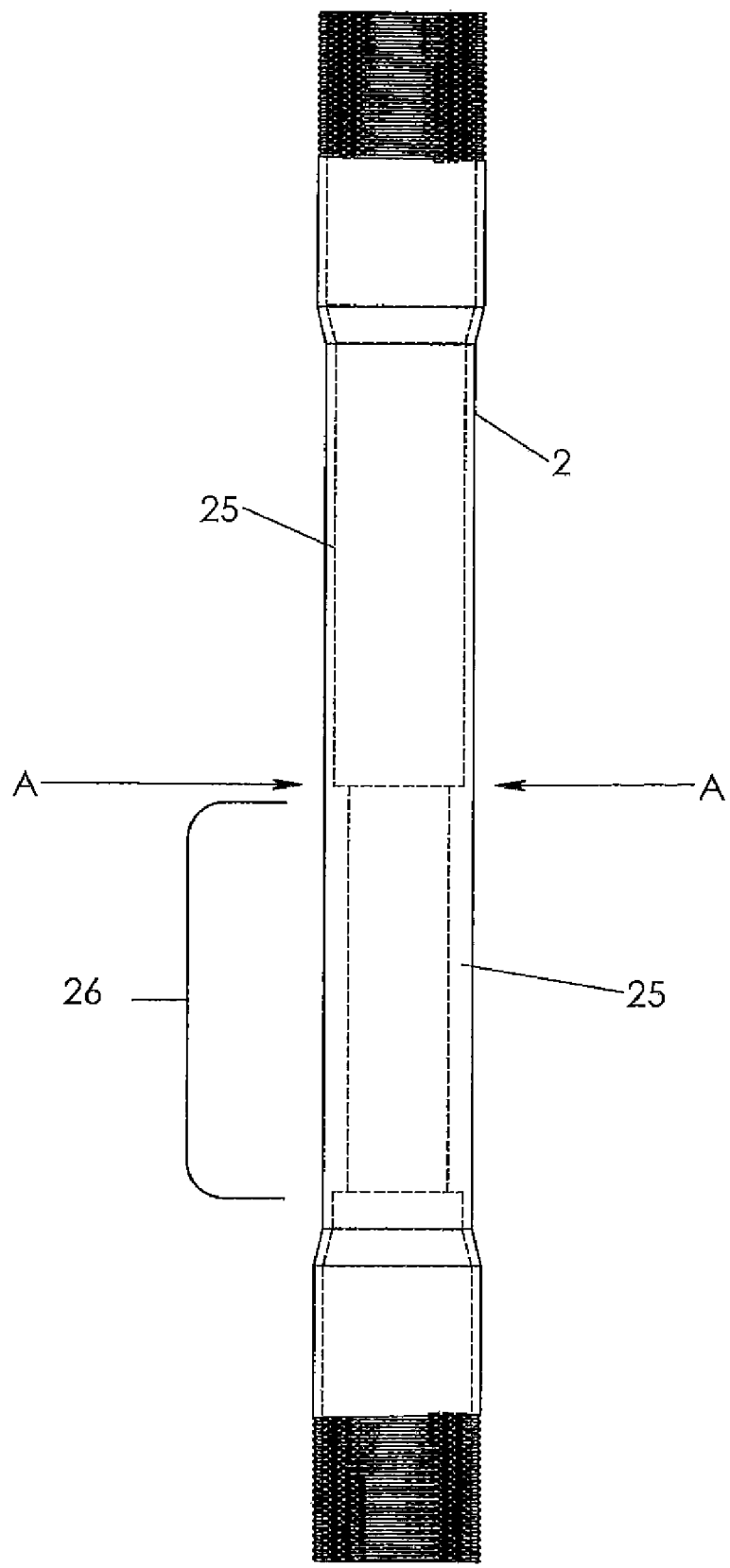
FIG. 9 is a side view of the spring housing of the present invention.

FIG. 9 is a side view of the spring housing of the present invention. As shown in this figure, the inside walls 25 of the spring housing 2 are preferably thicker on the lower end of the housing than they are on the top end of the housing. This design is what keeps the lower end of the primary spring 13 (not shown) in a stationary position, regardless of whether hydraulic pressure is applied. Thus, the outside diameter of the primary spring 13 is preferably greater than the inside diameter of the lower end 26 of the spring housing 2. The outside diameter of the primary pull rod 12 (not shown), on the other hand, is less than the inside diameter of the lower end 26 of the spring housing 2, which allows the primary pull rod 12 to move up and down within the entire length of the spring housing 2.

Figure 10:
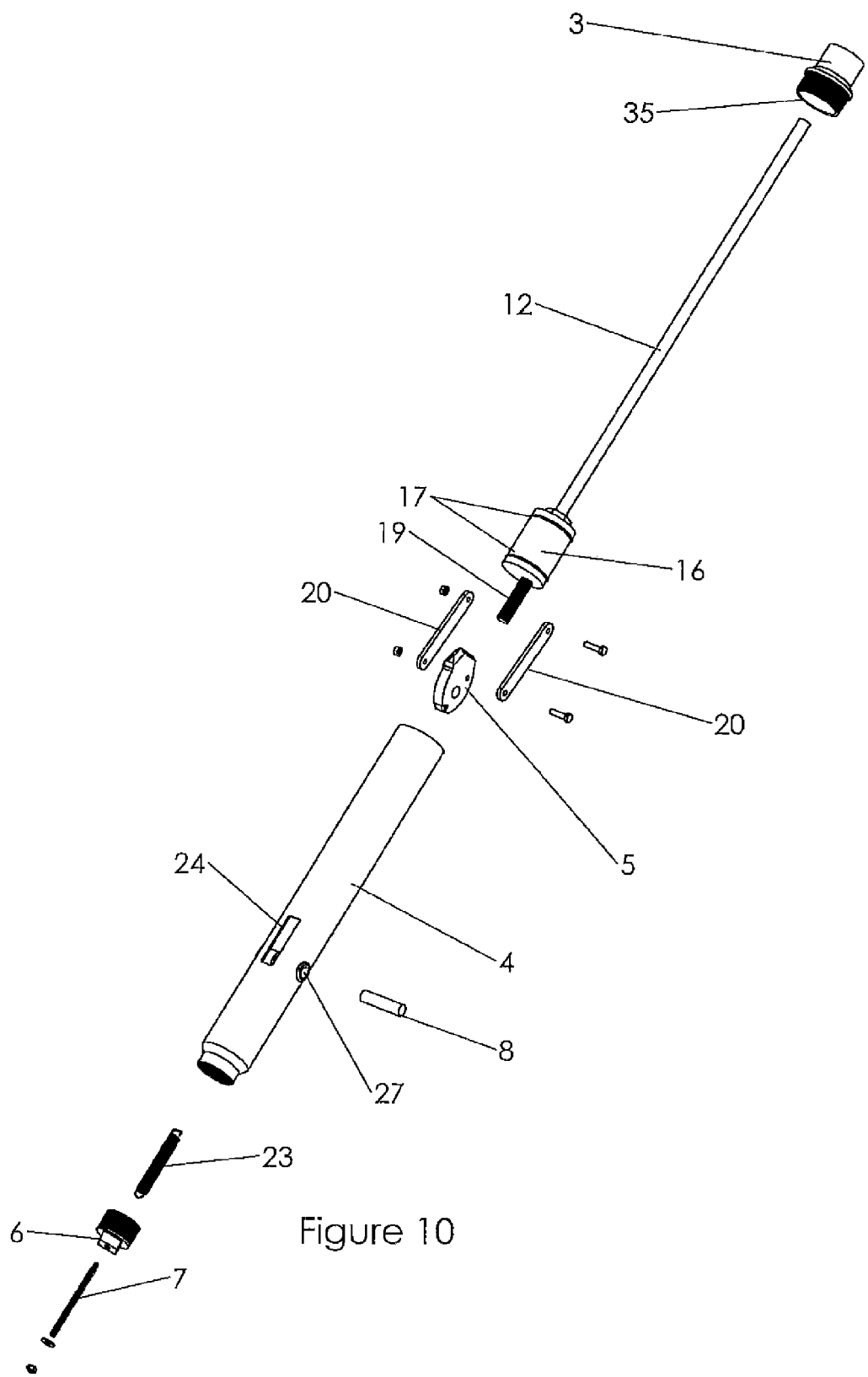
FIG. 10 is an exploded view of the lower assembly of the present invention.

FIG. 10 is an exploded view of the lower assembly of the present invention. As shown in this figure, the main housing 4 preferably comprises two apertures 27 on either side of the housing through which the blade pin 8 is inserted. In addition, the present invention preferably comprises two second attachment arms 20, one on either side of the blade 5. Each second attachment arm 20 is pivotably attached to the blade 5 on one end and to the first attachment arm 19 on the other end.

Figure 11:
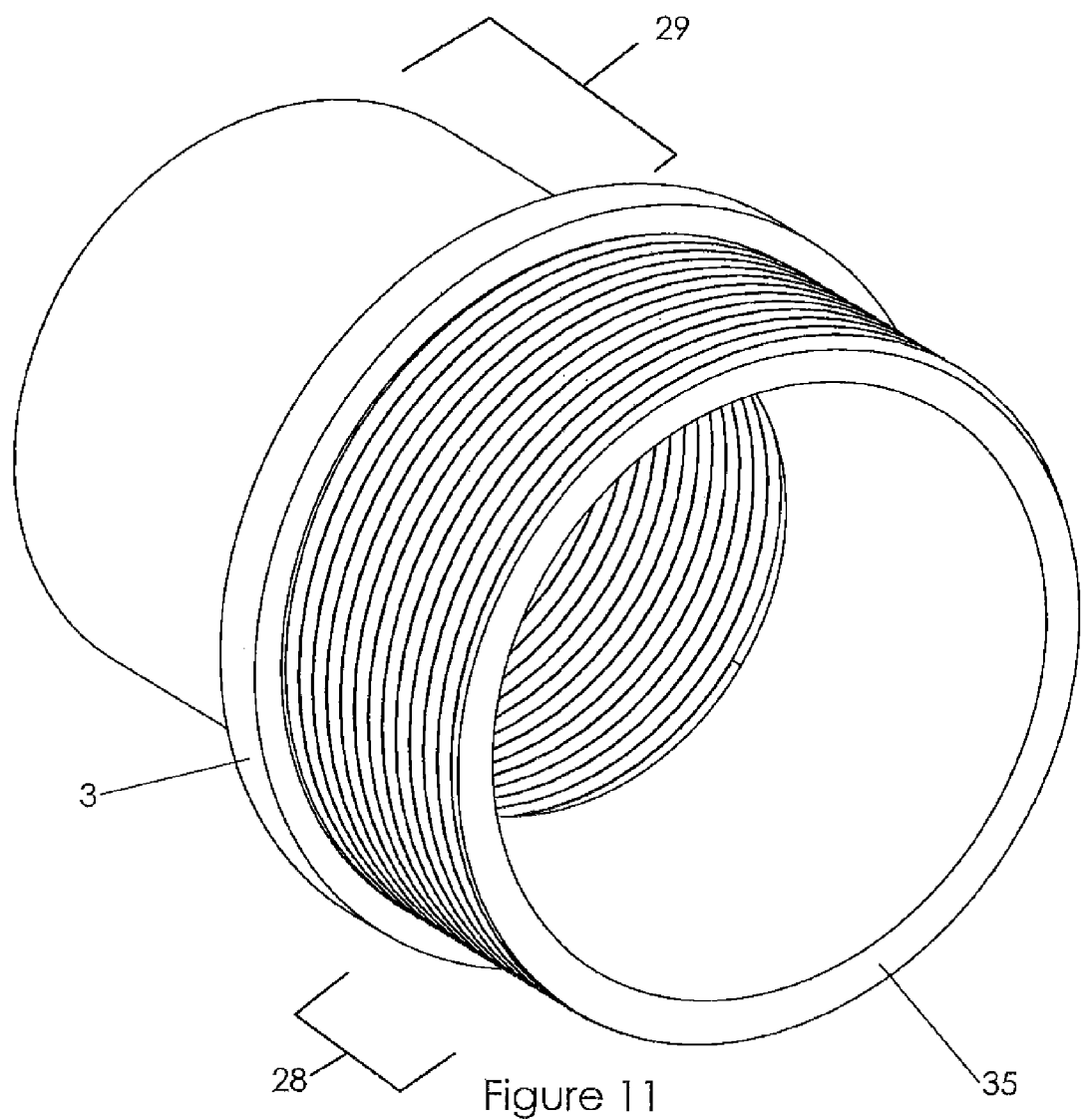
FIG. 11 is a perspective view of the coupling of the present invention.

FIG. 11 is a perspective view of the coupling of the present invention. This figure shows that the coupling 3 is preferably designed so that the bottom portion 28 of the coupling 3 has a greater inside diameter than the top portion 29 of the coupling. In addition, the bottom portion 28 of the coupling comprises a shoulder 35 against which the plunger is stopped in its upward movement (see FIGS. 5 and 7). Thus, the coupling may also be referred to as the plunger stop.

FIG. 12 is a side view of the present invention without the spring housing or the main housing and with the blade in a retracted position. FIG. 13 is the same view as shown in FIG. 12, except that the blade is in an extended position. Line A shows that the primary spring 13 is slightly compressed at the top end of the spring in FIG. 13 (hydraulic pressure applied) as compared to FIG. 12 (no hydraulic pressure applied). Line B shows that the bottom end of the spring 13 is in the same position regardless of whether hydraulic pressure is applied. Line C shows that the plunger 16 moves slightly downward when hydraulic pressure is applied (see FIG. 13), as compared to the position of the plunger 16 when no hydraulic pressure is applied (see FIG. 12). Line D shows that the position of the bottom end of the secondary spring 23 remains stationary regardless of whether hydraulic pressure is applied.

FIG. 14 is a partial perspective view of the present invention without the main housing and with the blade in a retracted position. FIG. 15 is the same view as shown in FIG. 14, except that the blade is in an extended position. These two figures provide greater detail than FIGS. 12 and 13, and they show clearly the position of the two second attachment arms 20 in relation to the blade 5 and first attachment arm 19. As this figure illustrates, it is important that the center of the blade 5 be kept stationary by the pin 8, which in turn is kept stationary by the bushings 34 shown in FIG. 18. The end piece 6 is preferably threaded and screws into the bottom end of the main housing 4 (see FIGS. 1 and 10).

Figures 16, 17:
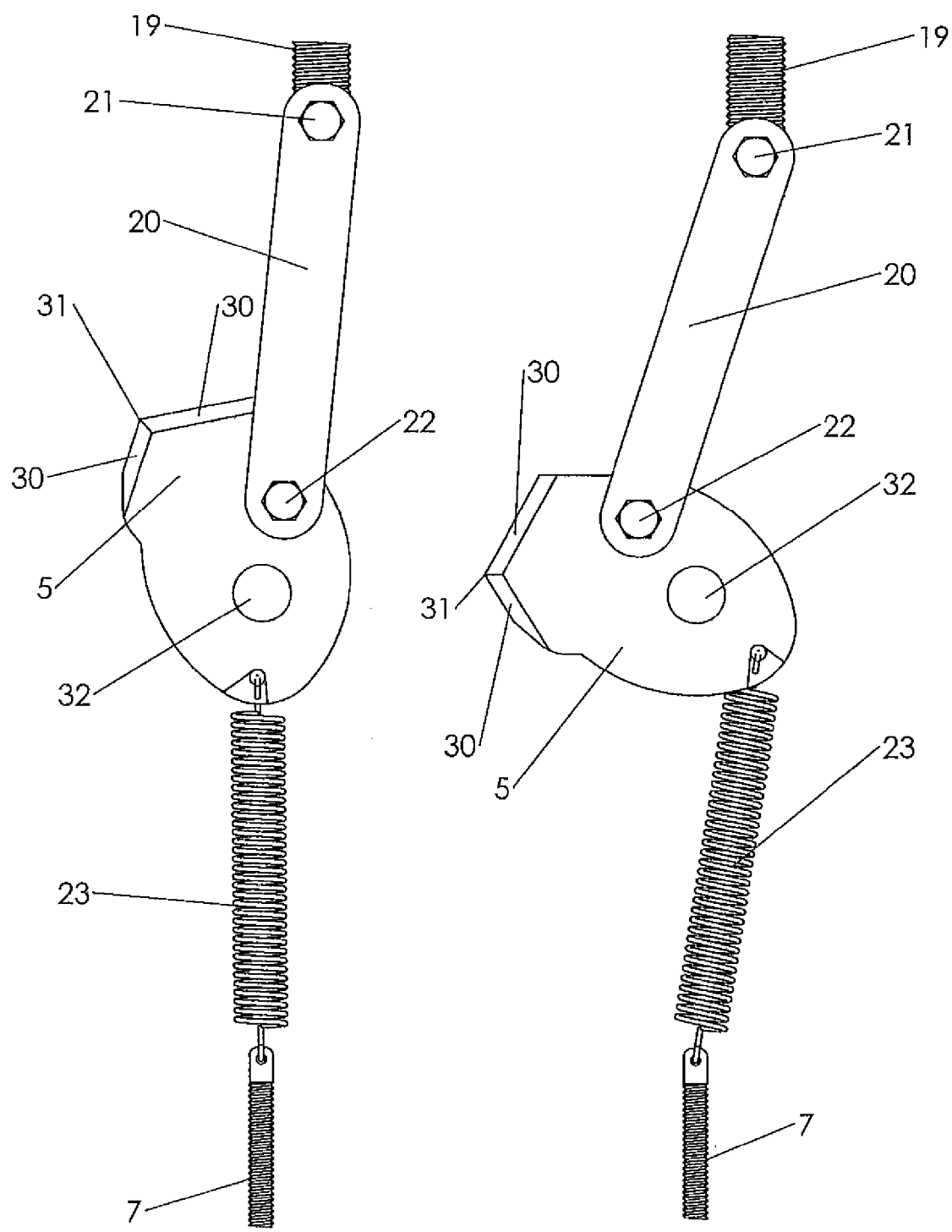
FIG. 16 is a partial side view of the present invention without the main housing or end piece and with the blade in a retracted position.
FIG. 17 is a side view of the blade portion of the present invention without the main housing or end piece and with the blade in an extended position.

FIG. 16 is a partial side view of the present invention without the main housing or end piece and with the blade in a retracted position. FIG. 17 is the same view as shown in FIG. 16, except that the blade is in an extended position. As shown in these figures, the blade 5 comprises a cutting edge 30. The cutting edge 30 is preferably sharp and preferably comprises a peak 31 that allows the blade 30 to puncture the production casing. The blade 5 further comprises an aperture 32 for the pin 8.

Figure 18:
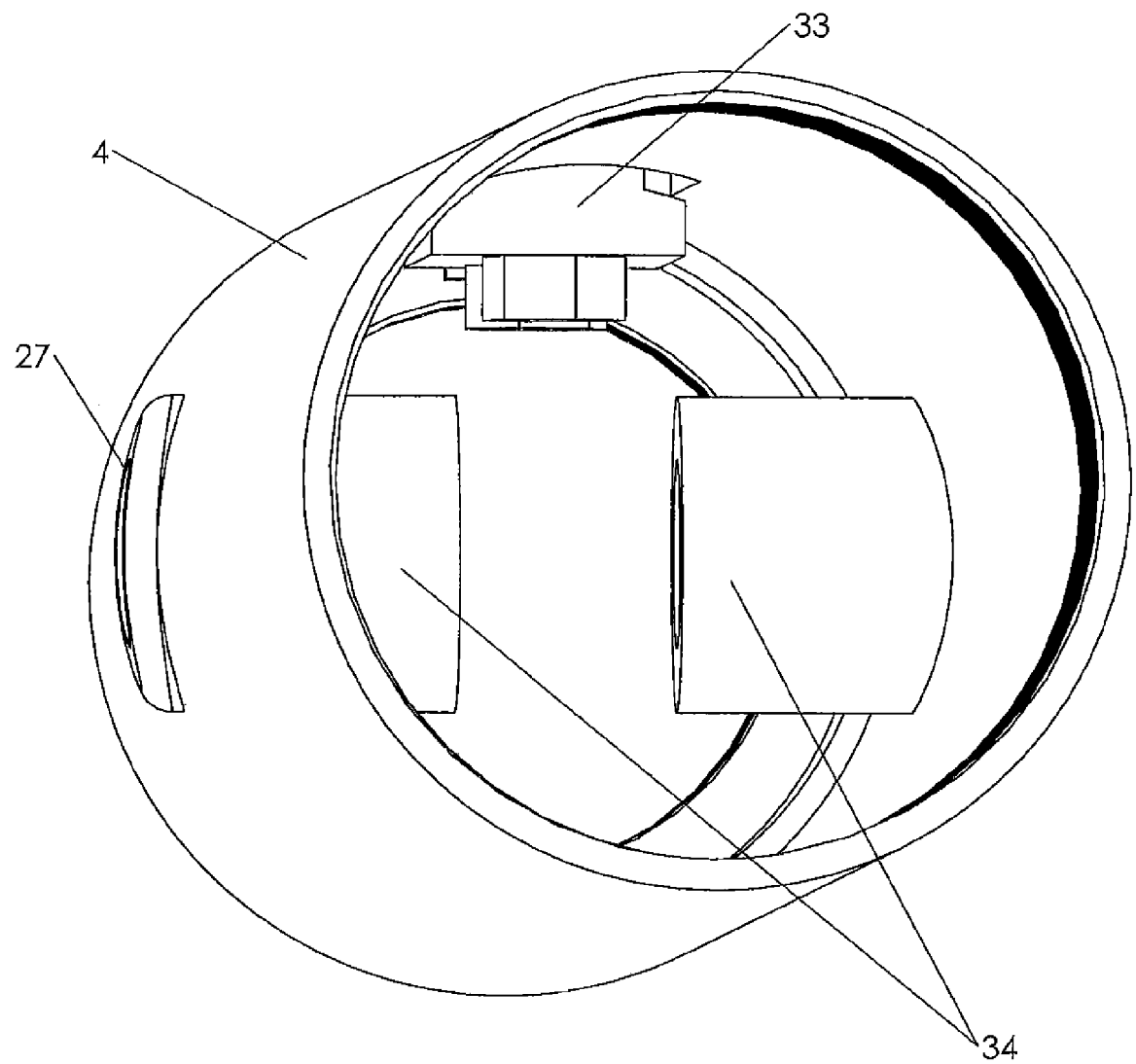
FIG. 18 is a perspective view of the inside of the main housing at the point at which the blade pin passes through the main housing.

FIG. 18 is a perspective view of the inside of the main housing at the point at which the blade pin passes through the main housing. As shown in this figure, the main housing 4 preferably comprises a support member 33 that is attached to the inside wall of the main housing directly beneath the aperture 24 through which the blade 5 exits the main housing (see FIG. 1). The location of this support member 33 is indicated with an "X" in FIG. 1. The purpose of the support member 33 is to provide additional support to the main housing 4 at a point where the main housing 4 experiences stress each time the blade is engaged.

FIG. 18 also shows the bushings 24 that preferably extend inward from the inside walls of the main housing. The bushings maintain the pin 8 (not shown) in a stationary position, and they also prevent the blade 5 (not shown) from moving side to side.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A production casing ripper comprising:
   (a) a swedge;
   (b) a spring housing;
   (c) a coupling;
   (d) a main housing;
   (e) an end piece;
   (f) a blade;
   (g) means for connecting the blade to the plunger;
   (h) a secondary spring and a secondary pull rod; and
   (i) a first attachment arm and two second attachment arms;
   wherein the spring housing is a piece of tubing comprising two ends;
   wherein one end of the spring housing is attached to the swedge and the other end of the spring housing is attached to the coupling;
   wherein the main housing is a piece of tubing comprising two ends;

wherein one end of the main housing is attached to the coupling and the other end of the main housing is attached to the end piece;

wherein the inside diameter of the main housing is greater than the inside diameter of the spring housing;

wherein the blade is situated inside of the main housing;

wherein a plunger is situated inside of the main housing;

wherein a primary spring is situated inside of the spring housing;

wherein a primary pull rod comprising two ends is connected to the primary spring at one end and to the plunger at the other end;

wherein the main housing comprises an aperture;

wherein when hydraulic pressure is introduced through the swedge, the plunger moves downward inside of the main housing and causes the blade to extend through the aperture in the main housing;

wherein when the hydraulic pressure is released, the primary spring causes the plunger to return to its original position, thereby causing the blade to retract;

wherein the first attachment arm comprises two ends, wherein the plunger comprises a bottom end and a top end, wherein the primary pull rod is attached to the top end of the plunger, wherein one end of the first attachment arm is attached to the bottom end of the plunger and the other end of the first attachment arm is pivotally attached to the two second attachment arms, wherein each of the second attachment arms comprises two ends, wherein one end of each second attachment arm is pivotally attached to the first attachment arm and the other end of each second attachment arm is pivotally attached to the blade, wherein when the plunger moves downward inside the main housing, the second attachment arms pivot on the first attachment arm and on the blade, thereby causing the blade to extend outward through the aperture in the main housing;

wherein the secondary spring comprises two ends;

wherein one end of the secondary spring is attached to the blade and the other end of the secondary spring is attached to the secondary pull rod;

wherein the secondary pull rod is attached to the end piece;

wherein the main housing comprises a bottom end;

wherein the end piece is attached to the bottom end of the main housing;

wherein when the blade is extended through the aperture in the main housing, the secondary spring expands, thereby creating tension in the secondary spring; and wherein when the hydraulic pressures is released, the tension in the secondary spring causes the blade to retract.

* * * * *